US010824328B2

(12) United States Patent
Bastide et al.

(10) Patent No.: US 10,824,328 B2
(45) Date of Patent: Nov. 3, 2020

(54) OPTIMIZED NON-GRID BASED NAVIGATION

(71) Applicant: International Business Machines Corporation, Armonk, NY (US)

(72) Inventors: Paul R Bastide, Boxford, MA (US); Matthew E. Broomhall, South Burlington, VT (US); Shane M. Kilmon, Littleton, MA (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

(21) Appl. No.: 15/603,236

(22) Filed: May 23, 2017

(65) Prior Publication Data
US 2018/0341398 A1 Nov. 29, 2018

Related U.S. Application Data

(63) Continuation of application No. 13/891,992, filed on May 10, 2013, now abandoned.

(51) Int. Cl.
*G06F 3/0488* (2013.01)
*G08G 1/0969* (2006.01)
(Continued)

(52) U.S. Cl.
CPC ........ *G06F 3/04883* (2013.01); *G06F 3/0488* (2013.01); *G08G 1/0969* (2013.01);
(Continued)

(58) Field of Classification Search
None
See application file for complete search history.

(56) References Cited

U.S. PATENT DOCUMENTS 7,345,675 B1    3/2008  Minakuchi et al.
7,978,177 B2    7/2011  Nash et al.
(Continued)

FOREIGN PATENT DOCUMENTS

WO    2012007745    1/2012

OTHER PUBLICATIONS

"Face Recognition Homepage: Algorithms" available at: http://facerec.org/algorithms/, last accessed May 10, 2013, 9 pages.
(Continued)

*Primary Examiner* — Nhat Huy T Nguyen
(74) *Attorney, Agent, or Firm* — Kunzler Bean & Adamson; Bruce R. Needham

(57) ABSTRACT

An optimized content navigation system includes a display device including a touch screen user interface and a navigation adjustor engine coupled to the display device. The navigation adjustor engine is configured to display navigable content on the touch screen user interface. The navigation adjustor engine is further configured to determine from the content at least one preferred path of navigation through the content. The preferred path of navigation is based on the content. The navigation adjustor engine is further configured to receive a user input that defines a path of navigation and adjust the user defined path of navigation to follow the preferred path of navigation in response to detection of the user defined path of navigation to be within a tolerance level of the preferred path of navigation. The navigation adjust engine is further configured to navigate through the content along the adjusted path of navigation.

15 Claims, 6 Drawing Sheets

(51) Int. Cl.
*G06F 3/0482* (2013.01)
*G06F 3/0484* (2013.01)

(52) U.S. Cl.
CPC ........ *G06F 3/0482* (2013.01); *G06F 3/04845* (2013.01); *G06F 2203/04806* (2013.01)

(56) References Cited

U.S. PATENT DOCUMENTS

| | | | |
|---|---|---|---|
| 9,014,976 B2* | 4/2015 | Ushida | G01C 21/3614 340/995.1 |
| 2003/0105576 A1* | 6/2003 | Kamiya | G01C 21/3664 701/102 |
| 2008/0174562 A1* | 7/2008 | Kim | G06F 3/0485 345/173 |
| 2009/0116702 A1 | 5/2009 | Conradt et al. | |
| 2009/0128483 A1 | 5/2009 | Robbins et al. | |
| 2010/0136957 A1 | 6/2010 | Horodezky et al. | |
| 2010/0156818 A1 | 6/2010 | Burrough et al. | |
| 2010/0175027 A1 | 7/2010 | Young et al. | |
| 2010/0251167 A1 | 9/2010 | Deluca et al. | |
| 2010/0265196 A1 | 10/2010 | Lee et al. | |
| 2011/0015857 A1* | 1/2011 | Uotani | G01C 21/367 701/533 |
| 2011/0066984 A1 | 3/2011 | Li | |
| 2011/0134110 A1* | 6/2011 | Song | G06F 3/04815 345/419 |
| 2011/0222774 A1 | 9/2011 | Hong et al. | |
| 2011/0271236 A1 | 11/2011 | Jain | |
| 2013/0044140 A1* | 2/2013 | Kim | G06F 3/0488 345/684 |
| 2013/0176244 A1* | 7/2013 | Yamamoto | G06F 3/041 345/173 |
| 2013/0179076 A1 | 7/2013 | Kobuya et al. | |
| 2013/0339891 A1 | 12/2013 | Blumenberg et al. | |
| 2013/0345981 A1 | 12/2013 | van Os et al. | |
| 2014/0129976 A1 | 5/2014 | Beaurepaire et al. | |

OTHER PUBLICATIONS

"Computer Vision" Wikipedia, available at: http://en.wikipedia.org/wiki/Computer_vision, last accessed May 10, 2013, 9 pages.

U.S. Appl. No. 13/891,992, filed May 10, 2013, Office Action Summary dated Jan. 30, 2015.

U.S. Appl. No. 13/891,992, filed May 10, 2013, Final Office Action Summary dated Feb. 11, 2016.

U.S. Appl. No. 13/891,992, filed May 10, 2013, Office Action Summary dated Jun. 30, 2016.

U.S. Appl. No. 13/891,992, filed May 10, 2013, Final Office Action Summary dated Nov. 23, 2016.

U.S. Appl. No. 13/891,992, filed May 10, 2013, Advisory Action dated Apr. 29, 2016.

U.S. Appl. No. 13/891,992, filed May 10, 2013, Advisory Action dated May 16, 2017.

* cited by examiner

OPTIMIZED NON-GRID BASED NAVIGATION

CROSS-REFERENCE TO RELATED APPLICATION

This application is a continuation of U.S. application Ser. No. 13/891,992, filed on May 10, 2013, which is incorporated by reference herein in its entirety.

BACKGROUND

Navigating content on a touch screen device may be difficult when the navigation is not limited to up and down directions and/or left and right directions. When navigation may proceed in more than an up/down or left/right direction, the path of navigation follows a user input. When a user wishes to navigate along a nonlinear path, the navigation may entail several user inputs to successfully navigate the path. The process involving multiple user inputs to successfully navigate a path may increase user frustration and decrease user satisfaction.

SUMMARY

Embodiments of a system are described. In one embodiment, an optimized content navigation system includes a display device including a touch screen user interface and a navigation adjustor engine coupled to the display device. The navigation adjustor engine is configured to display content on the touch screen user interface. The content is navigable. The navigation adjustor engine is further configured to determine from the content at least one preferred path of navigation through the content. The preferred path of navigation is based on the content. The navigation adjustor engine is further configured to receive a user input that defines a path of navigation and adjust the user defined path of navigation to follow the preferred path of navigation in response to detection of the user defined path of navigation to be within a tolerance level of the preferred path of navigation. The navigation adjust engine is further configured to navigate through the content along the adjusted path of navigation. Other embodiments of the system are also described, as well as embodiments of a computer program product and a method.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
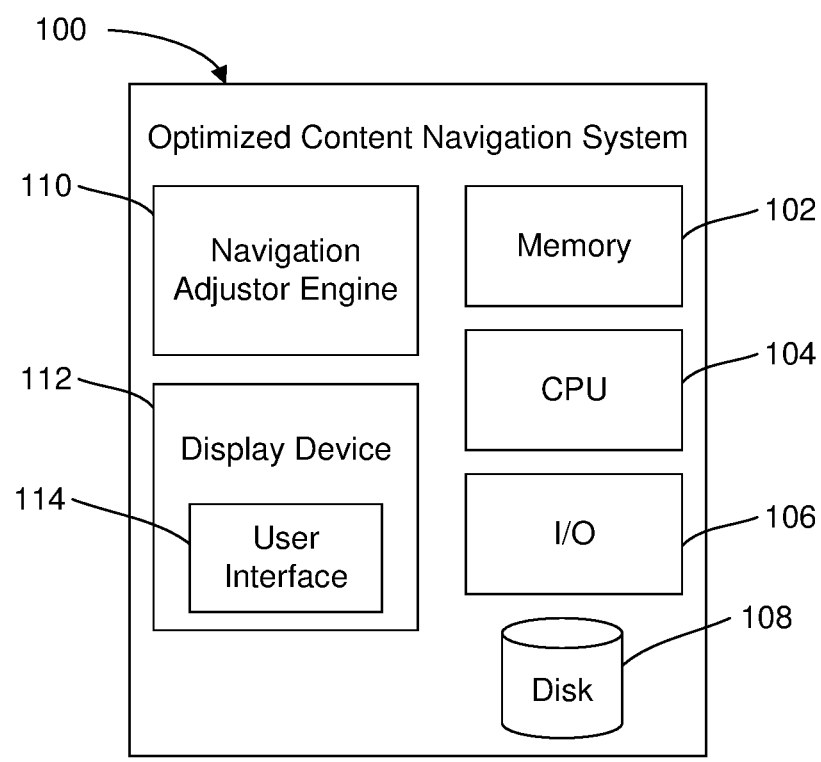
FIG. 1 depicts a schematic diagram of one embodiment of an optimized content navigation system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate simplified navigation of content on a user interface or a touch sensitive user interface. In many instances, navigating content may be difficult when a user seeks to navigate along a nonlinear path (e.g. a windy road on a map). Conventionally, the user may navigate using many small inputs so as not to navigate away from the desired path of navigation. In some embodiments described herein, the navigation of content may follow nonlinear and/or oblique paths by determining a preferred path of navigation and adjusting a user defined path of navigation to follow the preferred path of navigation if the user defined path of navigation is within a tolerance level of the preferred path. Some embodiments described herein may reduce the number of user inputs to navigate along a nonlinear path. Precise navigation along a preferred path of navigation reduces user frustration and increases user satisfaction. Users may also be more efficient in navigating content.

FIG. 1 depicts a schematic diagram of one embodiment of an optimized content navigation system 100. The depicted optimized content navigation system 100 includes various components, described below, that are capable of performing the functions and operations described herein. The illustrated optimized content navigation system 100 includes a computer memory device 102, a processing device 104, input/output devices 106, and a disk storage device 108. The illustrated optimized content navigation system 100 also includes a navigation adjustor engine 110 and a display device 112. Some or all of the components of the optimized content navigation system 100 may be stored on a single computing device or on a network of computing devices, including a wireless communication network. The optimized content navigation system 100 may be a single device such as a mobile phone, a smart phone, a portable media device, a tablet computer, a laptop computer, a desktop computer, or other device or a combination of devices. Although the optimized content navigation system 100 is shown and described with certain components and functionality, other embodiments of the optimized content navigation system 100 may include fewer or more components to implement less or more functionality.

The computer memory device 102 may store data and/or software instructions or computer program instructions for carrying out the operations described herein. The computer memory device 102 may be external or internal to the system and may include but is not limited to a hard drive, a CD/DVD recordable drive, a magnetic tape drive, a disk cartridge drive, a secure digital card, another type of magnetic or optical drive, a solid-state drive, or another type of memory device. The processing device 104 is connected to and in communication with the memory device 102 and may store and access data on the memory device 102 for performing the operations described herein. The processor or processing device 104 may also be connected to the disk storage device 108. The disk storage device 108 may be implemented to temporarily store data or software instructions from the memory device 102 or the processor 104. The disk storage device 108 may include but is not limited to a hard disk drive, a floppy disk drive, a removable floppy disk, or other type of optical or magnetic drive, or another persistent storage device. The functionality of the navigation adjustor engine 110 may be implemented by computer program instructions stored on the computer memory device 102 and executed by the processing device 104 such as a CPU.

A user interface 114 is displayed on the display device 112. The display device 112 may be any display device 112 for a computing device. The user interface 114 may be part of an operating system for the computing device and may allow a user to interact with the operating system. In some embodiments, the user interface 114 may be a touch sensitive user interface. The operations described herein may be associated with one or more applications configured to operate within the operating system.

In some embodiments, the navigation adjustor engine 110 is configured to display content on the touch sensitive user interface 114. The displayed content is navigable. In some embodiments, the content is navigable in more than four directions. In some embodiments, the navigation adjustor engine 110 is further configured to determine from the content at least one preferred path of navigation through the content. The preferred path of navigation is based on the content. For example, the preferred path of navigation may be a route on a map. The roads that define a route may be the preferred path of navigation. The route may entail many turns and may follow nonlinear roads. In another example, the preferred path of navigation may be faces in an image of a group of people. The preferred path of navigation may be detected through facial recognition software and may follow a path from face to face in an image as a user may zoom in on the image in order to look more closely at the faces. In some embodiments, the preferred path of navigation is defined by similar content objects within the content. For example, for the image described above the similar content objects may be the faces of the people. Alternatively, the content objects may be shoes or another content object within the image. In the map example, the content objects may be houses, restaurants, or gas stations, etc. In some embodiments, the preferred path of navigation is nonlinear. In some embodiments, the navigation adjustor engine 110 is further configured to receive a user input defining a path of navigation. On a touch sensitive user interface 114, the user input may be a swipe defining a direction or path of navigation through the content.

In some embodiments, the navigation adjustor engine 110 is further configured to adjust the user defined path of navigation to follow the preferred path of navigation in response to detecting the user defined path of navigation to be within a tolerance level of the preferred path of navigation. In some embodiments, the tolerance level may be an angle between the user defined path of navigation and the preferred path of navigation. In some embodiments, the angle is predetermined. In some embodiments, the content and the number of preferred paths of navigation will limit the tolerance level of the angle between a user defined path and a preferred path. In some embodiments, the navigation adjustor engine 110 is further configured to navigate through the content along the adjusted path of navigation.

In some embodiments, the navigation adjustor engine 110 is further configured to rotate the content on the touch screen user interface 114. In some embodiments, the rotation of the content on the touch screen user interface 114 is based on the preferred path of navigation. For example, where the preferred path of navigation is a route on a map, the content (the map) may rotate during navigation to reorient the route on the map. In another example, where the preferred path of navigation is faces in an image, the content (the image) may rotate so as to always display a currently viewed face vertically on the touch screen user interface 114. In some embodiments, the navigation adjustor engine 110 is further configured to detect similar content objects within the content. In some embodiments, the preferred path of navigation is defined by content objects within the content. In some embodiments, the navigation adjustor engine 110 is further configured to receive a user selection of the content objects that define the preferred path of navigation. In the example of the map, the user may select houses as the similar content objects that define the preferred path of navigation. In the example of the image, the user may select the faces as the content objects that define the preferred path of navigation. In some embodiments, the navigation adjustor engine 110 is further configured to detect the similar content objects that define the preferred path of navigation. In some embodiments, the content objects detected are based on the current display of the content. For example, the current display of a map may dictate the content objects detected. At a high level the detected content objects may be highways and interstates. In a zoomed in view of the map, the detected content objects may be houses or other buildings. In a further zoomed view, the detected content objects may be walking paths. In some embodiments, the navigation adjustor engine 110 is further configured to monitor user interaction with the content to determine the preferred path of navigation. For example, the user interaction may indicate that the user is navigating in search of a restaurant allowing the navigation adjustor engine 110 to determine a preferred path of navigation along a path from restaurant to restaurant.

In addition to the advantages which may be achieved by implementation of the individual components of the optimized content navigation system 100, some embodiments of the optimized content navigation system 100 provide additional advantages over conventional technology. For example, some embodiments of the optimized content navigation system 100 allow a user to quickly navigate through content along a nonlinear path with a single input. Embodiments of the optimized content navigation system 100 allow a user to efficiently navigate content by determining from the content a path of navigation. Embodiments of the optimized content navigation system 100 may increase user satisfaction in navigation of content and decrease user frustration.

Figure 2A:
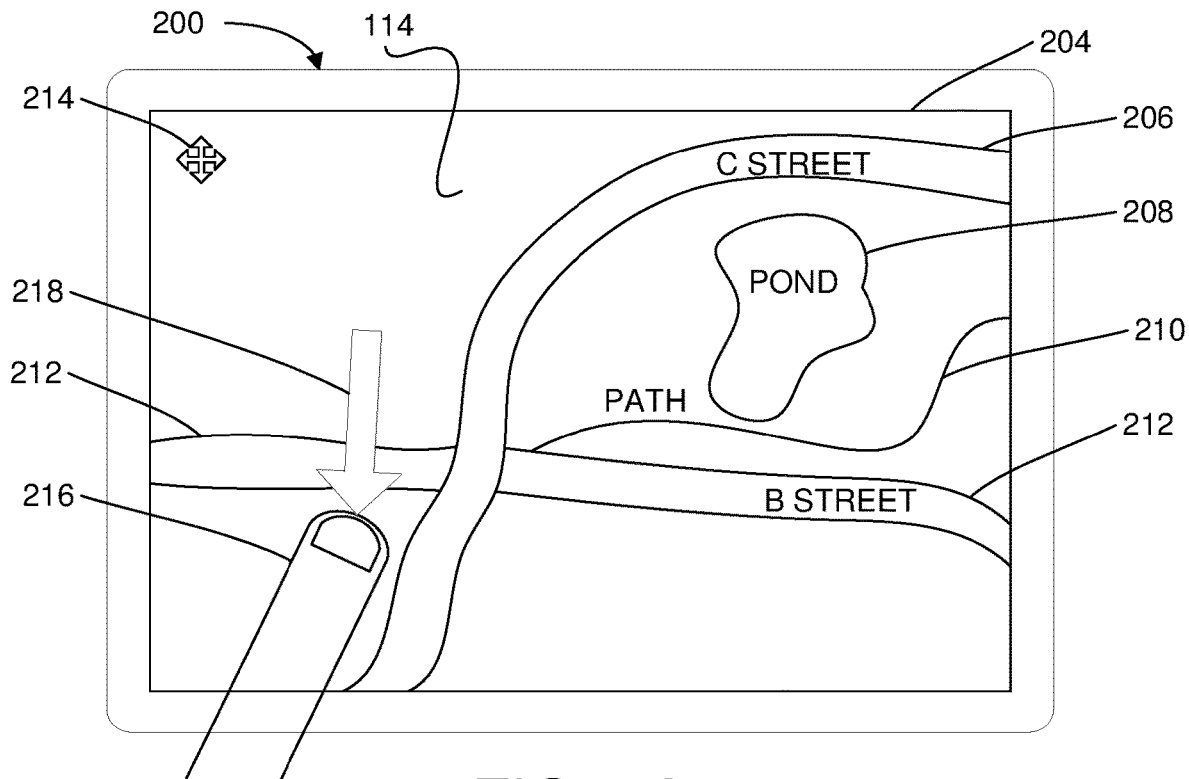
FIG. 2A depicts one embodiment of a touch screen user interface of a mobile computing device displaying content and implementing the optimized content navigation system of FIG. 1.

FIG. 2A depicts one embodiment of a touch screen user interface 114 of a mobile computing device 200 displaying content 204 and implementing the optimized content navigation system 100 of FIG. 1. This embodiment depicts a mobile computing device 200 displaying a map 204. The content or map 204 shows various content objects such as a first road 206, a pond 208, a walking path 210 and a second road 212. The map 204 also includes a navigation icon 214 indicating that the content 204 is navigable. FIG. 2A also depicts a user 216 and a visual representation 218 of the direction and length of a user input or swipe.

Some embodiments include determining from the content at least one preferred path of navigation. The preferred paths of navigation relate to the content. The first road 206, labeled "C Street", may be determined as a preferred path of navigation following the road 206 in either direction. The second road 212, labeled "B Street", may be determined as a second preferred path of navigation following the road 212 in either direction. Additionally, the walking path 210 may be determined as another preferred path of navigation. In a zoomed view, the shoreline of the pond 208 may be determined as a preferred path of navigation. In some embodiments, the preferred path of navigation may be a predetermined route on the map 204. In some embodiments, the preferred path of navigation may defined by content objects 206-212 within the content 204. In some embodiments, the preferred path of navigation is nonlinear. The preferred path of navigation may be defined by similar content objects within the content 204. For example, a user may desire to locate a gas station on the map 204. By tapping a gas station or otherwise indicating or selecting a gas station, the preferred path of navigation from gas station to gas station is determined. The preferred path of navigation may follow a path from one body of water to the next, from house to house, from restaurant to restaurant etc. In some embodiments, the similar content objects that may define the preferred path of navigation are selected by the user 216. In some embodiments, the preferred path of navigation may be determined by monitoring user interaction with the content 204. For example, monitoring user interaction may indicate the user is navigating along the road 206, and determine that road 206 is a preferred path of navigation.

FIG. 2A depicts a user input from a user 216. The user 216 is represented by a floating finger. The visual representation 218 of the user input indicates the length and direction of the user input. In this embodiment, the user input is a nearly vertical swipe on the touch screen user interface 114. FIG. 2A shows that the user 216 swipes the touch screen user interface 114, starting at the base of the arrow 218 and finishing at the point of the arrow 218. In some embodiments, the input may be from other input devices such as a mouse or keyboard, or another input on a touch screen user interface 114. The user input defines a direction or path of navigation. In this embodiment, the user input defines a direction or path of navigation nearly vertical in the opposite direction indicated by the arrow or visual representation 218 (i.e. the downward swipe defines a direction of navigation upward). In some embodiments, the user defined path of navigation is adjusted to follow the preferred path of navigation 206 in response to detecting the user defined path of navigation to be within a tolerance level of the preferred path of navigation 206. In some embodiments, the tolerance level may be a predetermined angle between the preferred path of navigation and the user defined path or direction of navigation. For example, in the illustrated embodiment of FIG. 2A, any user defined path or direction of navigation that is within 10 degrees of the direction following the preferred path of navigation 206 or the preferred path of navigation 212 will adjust the user defined path of navigation to follow the preferred path of navigation 206 or the preferred path of navigation 212, respectively. In some embodiments, the tolerance level may be a distance from a content object 206. For example, a user input defining a path of navigation on or near the road 206 will adjust the user defined path of navigation to follow the road 206.

Figure 2B:
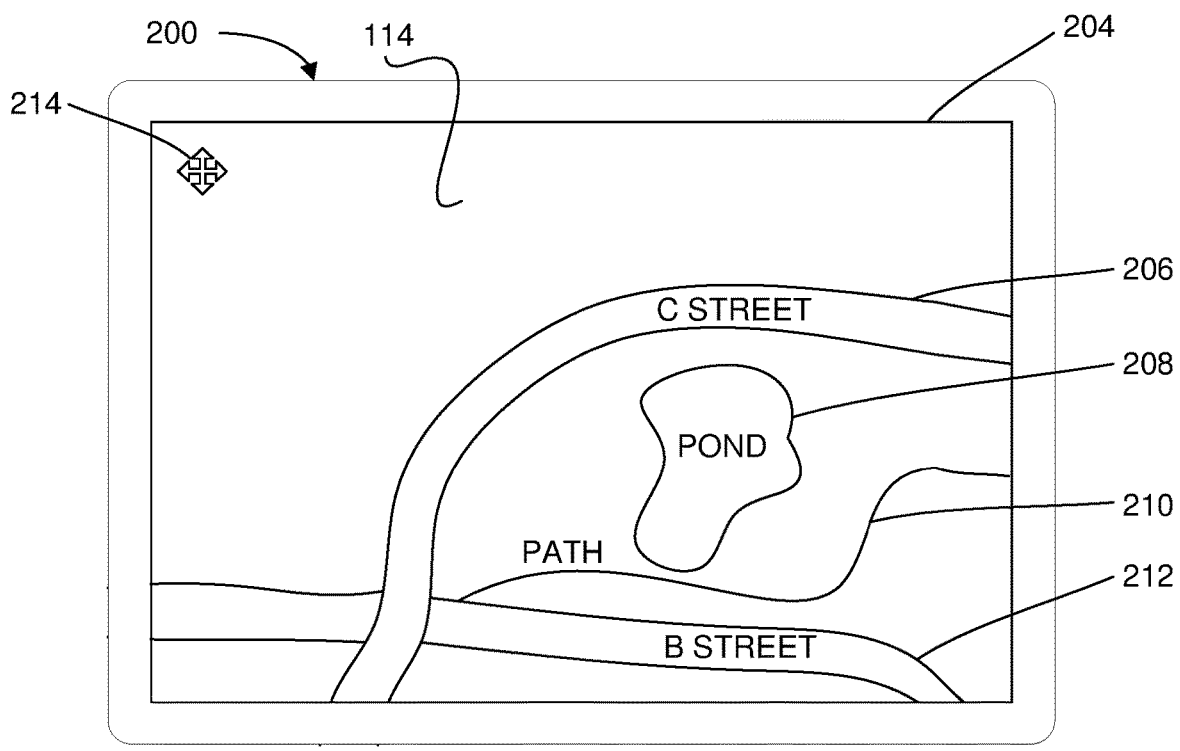
FIG. 2B depicts one embodiment of the touch screen user interface of the mobile computing device of FIG. 2A after receiving a user input defining a path of navigation and adjusting the user defined path of navigation to follow a preferred path of navigation.

FIG. 2B depicts one embodiment of the touch screen user interface 114 of the mobile computing device 200 of FIG. 2A after receiving a user input defining a path of navigation and adjusting the user defined path of navigation to follow the preferred path of navigation 206. The user input, shown by the visual representation 218 in FIG. 2A, defines a direction or path of navigation nearly vertical. The user defined direction or path of navigation is adjusted to follow the preferred path of navigation 206. FIG. 2B shows the display of the content 204 after navigating through the content 204 along the adjusted path of navigation. The preferred path of navigation 206 is nonlinear and follows along the road 206. The adjusted path of navigation is not nearly vertical in a straight direction but is adjusted to follow the curvature of the preferred path of navigation 206. The content 204 navigates along a curved path.

Figure 2C:
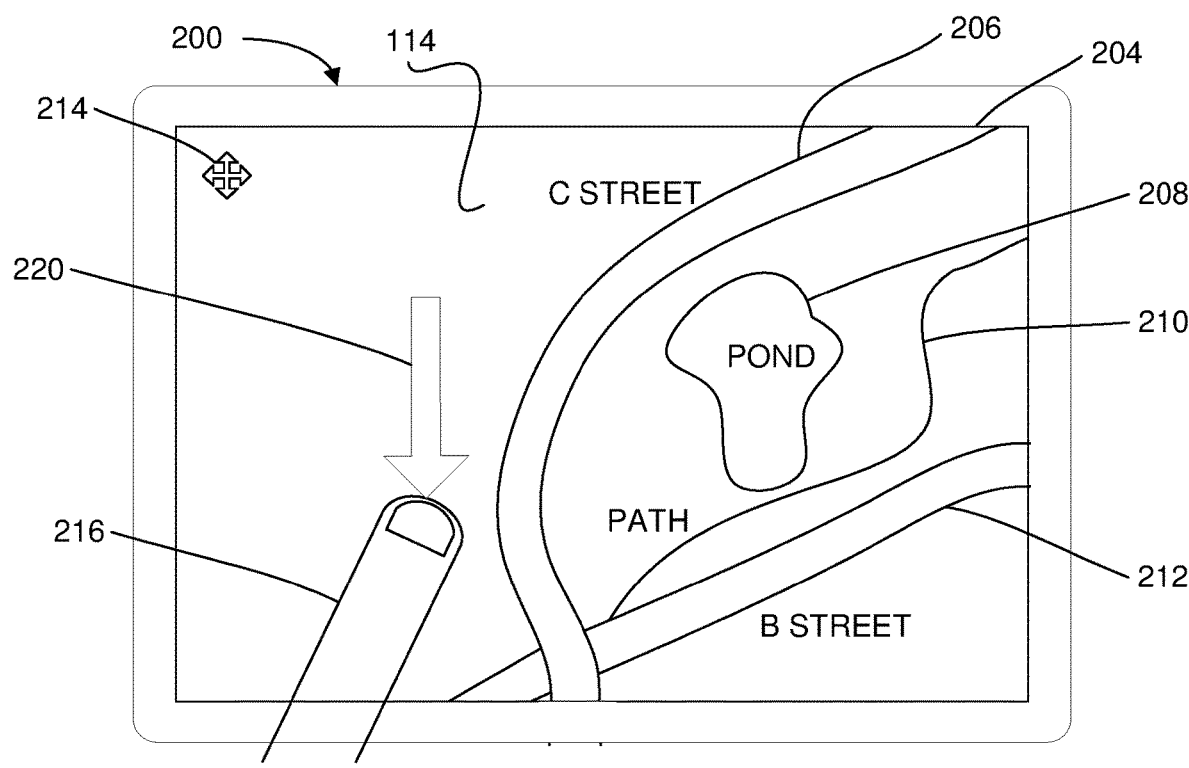
FIG. 2C depicts one embodiment of the touch screen user interface of the mobile computing device of FIG. 2A after receiving a user input defining a path of navigation and adjusting the user defined path of navigation to follow a preferred path of navigation and rotating the content.

FIG. 2C depicts one embodiment of the touch screen user interface 114 of the mobile computing device 200 of FIG. 2A after receiving a user input defining a path of navigation and adjusting the user defined path of navigation to follow a preferred path of navigation and rotating the content 204. The user input, shown by the visual representation 218 in FIG. 2A, defines a direction or path of navigation nearly vertical. The user defined direction or path of navigation is adjusted to follow the preferred path of navigation 206. FIG. 2C shows the display of the content 204 after navigating through the content 204 along the adjusted path of navigation. FIG. 2C also shows rotation on the content 204 to reorient the preferred path of navigation 206 on the touch screen user interface 114. FIG. 2C also shows a user 216 and a visual representation 220 of the direction and length of another user input defining a direction or path of navigation.

Figure 2D:
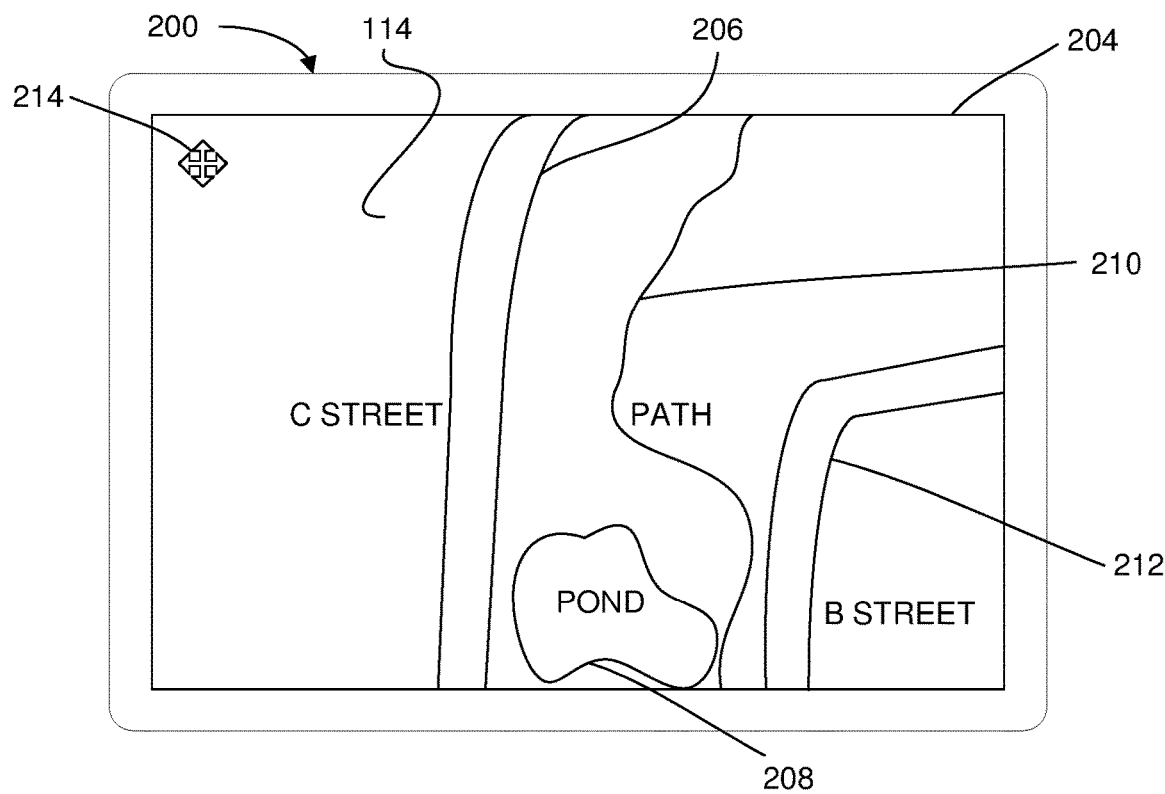
FIG. 2D depicts one embodiment of the touch screen user interface of the mobile computing device of FIG. 2C after receiving a user input defining a path of navigation and adjusting the user defined path of navigation to follow the preferred path of navigation.

FIG. 2D depicts one embodiment of the touch screen user interface 114 of the mobile computing device 200 of FIG. 2C after receiving the user input defining a path of navigation and adjusting the user defined path of navigation to follow the preferred path of navigation 206. The user input, shown by the visual representation 220 in FIG. 2C, defines a direction or path of navigation nearly vertical. The user defined direction or path of navigation is adjusted to follow the preferred path of navigation 206. FIG. 2D shows the content 204 after navigating through the content 204 along the adjusted path of navigation. FIG. 2D also shows rotation of the content 204 to reorient the preferred path of navigation 206 on the touch screen user interface 114.

Figure 3A:
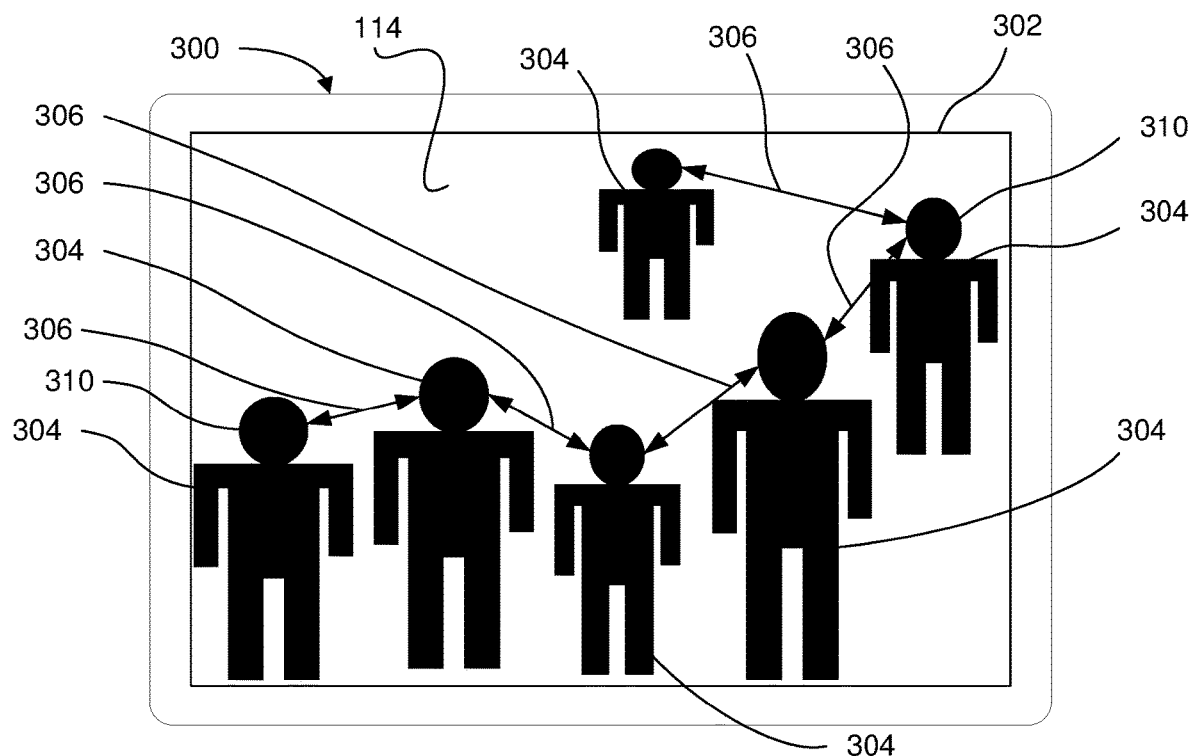
FIG. 3A depicts another embodiment of a touch screen user interface of a mobile computing device displaying content and implementing the optimized content navigation system of FIG. 1 while showing a preferred path of navigation of the content.

FIG. 3A depicts another embodiment of a touch screen user interface 114 of a mobile computing device 300 displaying content 302 and implementing the optimized content navigation system 100 of FIG. 1 while showing a preferred path of navigation 306 of the content 302. The content 302 is of an image or picture of a group of persons 304. In some embodiments, the preferred path of navigation is defined by similar content objects. This embodiment shows a preferred path of navigation 306. The preferred path of navigation 306 follows a path from head 310 to head 310 of the persons 304. In another embodiment, the preferred path of navigation may follow from feet to feet (not shown) of the persons 304. In some embodiments, the user selects the content object 310 that defines a preferred path of navigation. For example, the user may select the head of a person 304 for closer examination. In some embodiments, user interaction with the content is monitored to determine a preferred path of navigation. For example, if the user zooms in on the faces of the persons 304 the system 100 may determine a preferred path of navigation from face to face on the image 302.

Figure 3B:
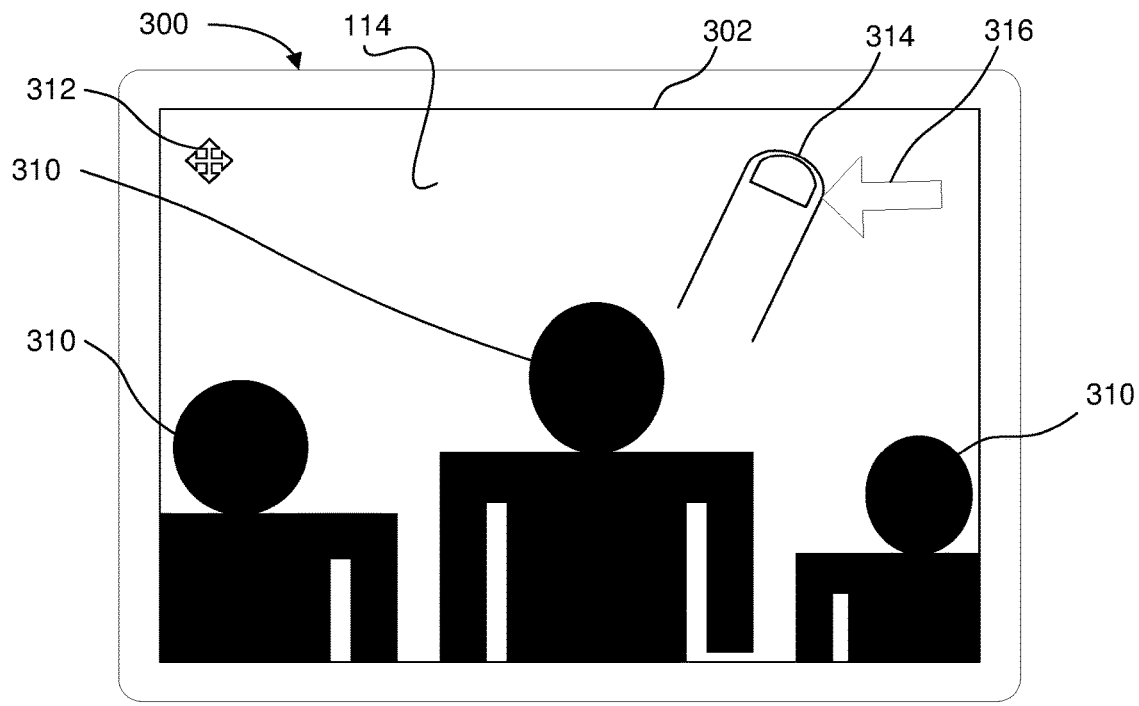
FIG. 3B depicts one embodiment of the touch screen user interface of the mobile computing device of FIG. 3A showing a user input defining a direction of navigation.

FIG. 3B depicts one embodiment of the touch screen user interface 114 of the mobile computing device 300 of FIG. 3A showing a user input defining a direction of navigation. After a user 314 selects the content object 310 a preferred path of navigation is determined. FIG. 3B shows a zoomed view of the image shown in FIG. 3A. FIG. 3B also shows a navigation icon 312 indicating the content 302 is navigable. FIG. 3B also depicts a visual representation 316 of the direction and length of user swipe or user input on the touch screen user interface 114. The user input defines a path of navigation substantially horizontal. In this embodiment, the user defined path of navigation is within a tolerance level of the preferred path of navigation 306, shown in FIG. 3A. The user defined path of navigation is adjusted to follow the preferred path of navigation to the next content object 310.

Figure 3C:
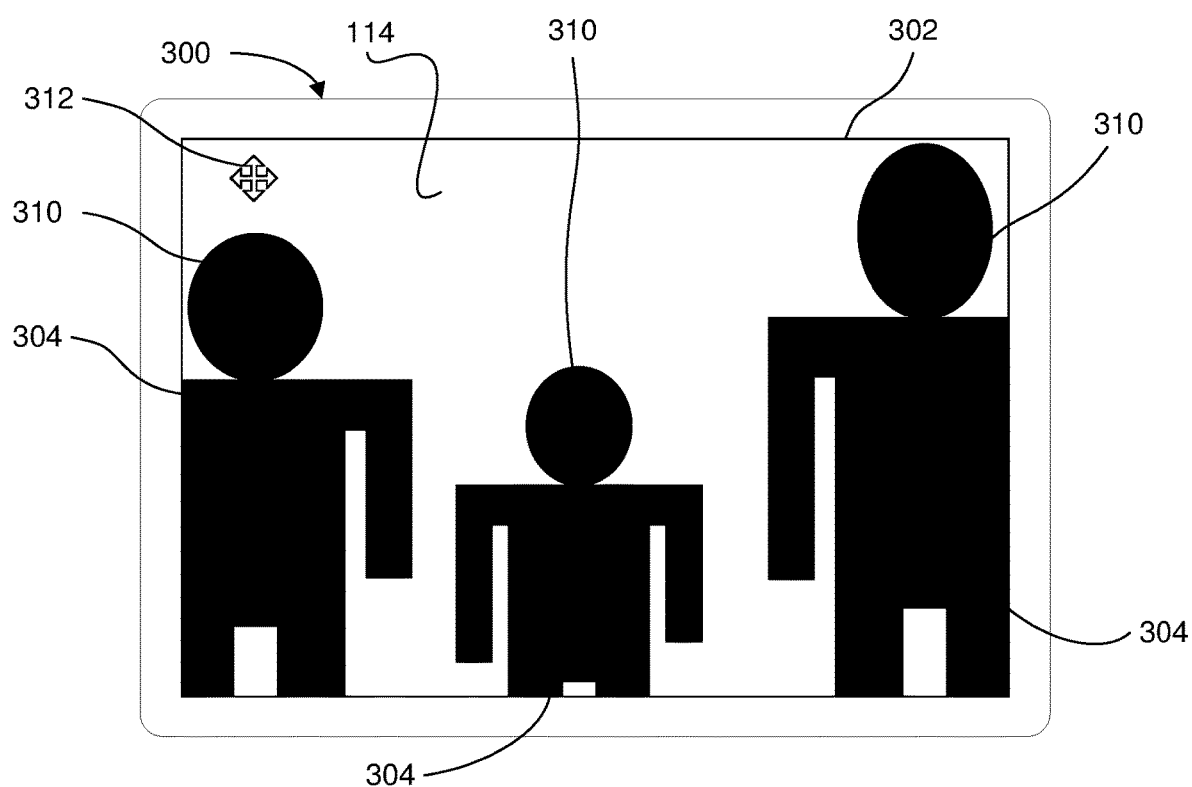
FIG. 3C depicts one embodiment of the touch screen user interface of the mobile computing device of FIG. 3B after receiving a user input defining a direction of navigation and adjusting the direction of navigation to follow the preferred path of navigation shown in FIG. 3A.

FIG. 3C depicts one embodiment of the touch screen user interface 114 of the mobile computing device 300 of FIG. 3B after receiving a user input defining a direction of navigation and adjusting the direction of navigation to follow the preferred path of navigation 306, shown in FIG. 3A. FIG. 3C shows the content 302 after navigating through the content 302 along the adjusted user defined path of navigation centering on the next content object 310 along the preferred path of navigation 306.

Figure 4:
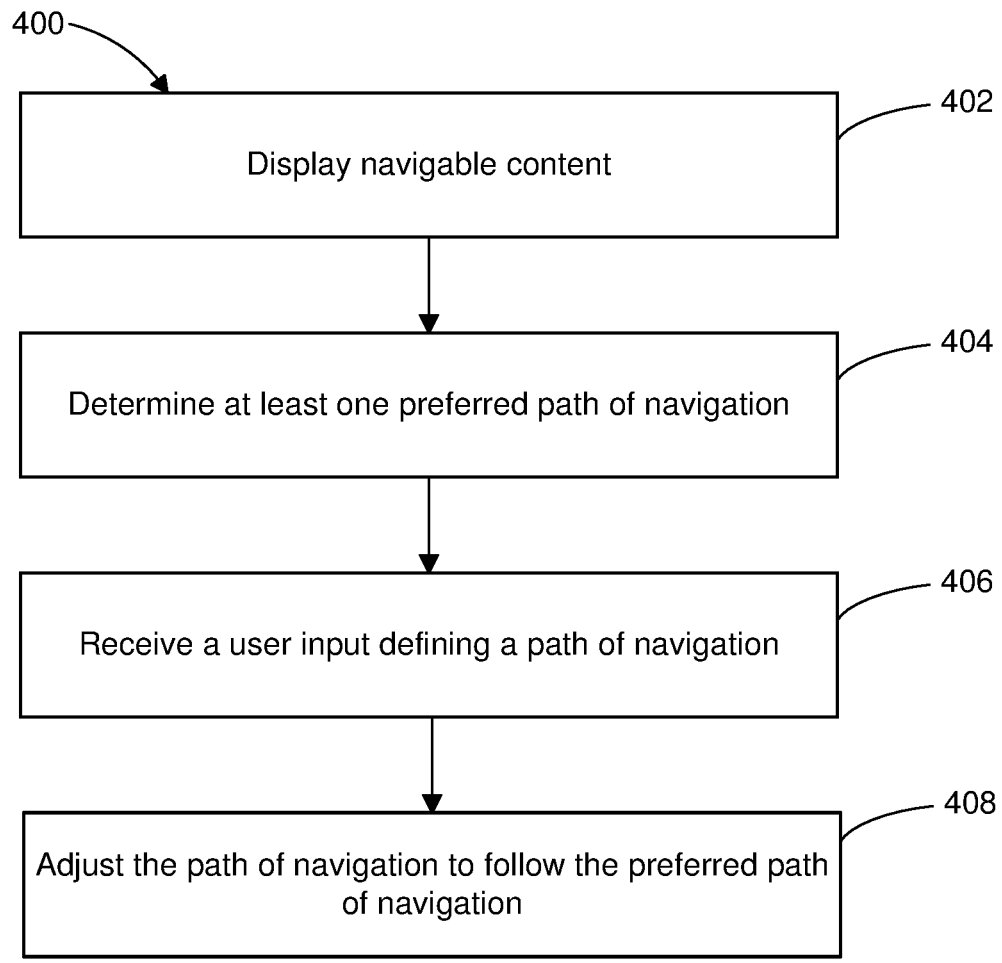
FIG. 4 depicts a flow chart diagram of one embodiment of a method for optimizing navigation of content.

FIG. 4 depicts a flow chart diagram of one embodiment of a method for optimizing navigation of content 400. Although the method for optimizing navigation of content 400 is described in conjunction with the touch screen user interfaces and mobile computing devices of FIGS. 2A-2D and FIGS. 3A-3C, embodiments of the method for optimizing navigation of content 400 may be implemented with other types of computer systems.

At 402, navigable content is displayed. In some embodiments, the content is navigable in more than four directions. At 404, at least one preferred path of navigation 206 is determined from the content 204. In some embodiments, the preferred path of navigation 206 is a nonlinear path. The preferred path of navigation 206 is based on the content 204 displayed on the touch screen user interface 114. At 406, a user input defining a path of navigation is received. At 408, the user defined path of navigation is adjusted to follow the preferred path of navigation 206. In some embodiments, the adjustment of the direction of navigation to follow the preferred path of navigation 206 is in response to detecting the user defined path of navigation to be within a tolerance level of the preferred path of navigation 206. The depicted method for optimizing navigation of content 400 then ends.

Some embodiments include navigating through the content 204 along the preferred path of navigation 206. Some embodiments include rotating the content 204 on the touch screen user interface 114. In some embodiments, the rotating the content 204 on the touch screen user interface 114 is based on the preferred path of navigation 206. Some embodiments include detecting similar content objects 310 within the content 302. In some embodiments, the preferred path of navigation 306 is defined by the similar content objects 310 within the content 302. In some embodiments, the rotating the content 302 is based on the content objects 310. In some embodiments, the method 400 includes receiving a user selection on the similar content objects 310 that define the preferred path of navigation 306. In some embodiments, the method 400 includes detecting the similar content objects 310. In some embodiments, the content objects detected 310 depends on a current display of the content 302. In some embodiments, detecting the preferred path of navigation 306 is based on monitoring user interaction with the content 302. In some embodiments, detecting the preferred path of navigation 306 is based on monitoring user navigation of the content 302. In some embodiments, the method 400 includes monitoring user navigation of the content to determine the content objects that the user desires to view.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

An embodiment of an optimized content navigation system includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising:
    a computer useable non-transitory storage medium including a computer readable program, wherein the computer readable program includes instructions that, when executed by a processing device within a computer, cause the computer to perform operations comprising:
        displaying content on a touch screen user interface, wherein the content is navigable;
        determining from the content at least one preferred path of navigation through the content, wherein the preferred path of navigation is based on the content and at least a portion of the preferred path is non-linear;
        receiving a user input defining a path of navigation, wherein the user input comprises a swipe on the content displayed on the touchscreen, wherein the user input begins in a location on the touchscreen different than where the preferred path is displayed on the touchscreen;
        adjusting the user defined path of navigation to follow the preferred path of navigation in response to detecting a difference between an angle of the user defined path of navigation and an angle of the preferred path of navigation to be within a tolerance level of the preferred path of navigation; and
        navigating through the content along the adjusted path of navigation and rotating the content on the touch screen user interface to maintain a portion of the preferred route in a particular orientation, wherein the rotating the content is based on the preferred path of navigation.

2. The computer program product of claim 1, wherein the operations further comprise detecting similar content objects within the content, and wherein the preferred path of navigation is defined by the similar content objects within the content.

3. The computer program product of claim 2, wherein the similar content objects that define the preferred path of navigation are selected by a user.

4. The computer program product of claim 1, wherein determining from the content the at least one preferred path of navigation comprises detecting content objects within the content, wherein the preferred path of navigation is defined by the content objects, and wherein the content objects detected depends on a current display of the content.

5. The computer program product of claim 1, wherein the operations further comprise monitoring user interaction with the content to determine the at least one preferred path of navigation.

6. A method for optimizing navigation of content, the method comprising:
    displaying content on a touch screen user interface, wherein the content is navigable;
    determining from the content at least one preferred path of navigation through the content, wherein the preferred path of navigation is based on the content and at least a portion of the preferred path is non-linear;
    receiving a user input defining a path of navigation, wherein the user input comprises a swipe on the content displayed on the touchscreen, wherein the user input begins in a location on the touchscreen different than where the preferred path is displayed on the touchscreen;

adjusting the user defined path of navigation to follow the preferred path of navigation in response to detecting a difference between an angle of the user defined path of navigation and an angle of the preferred path of navigation to be within a tolerance level of the preferred path of navigation; and navigating through the content along the adjusted path of navigation and rotating the content on the touch screen user interface to maintain a portion of the preferred route in a particular orientation, wherein the rotating the content is based on the preferred path of navigation.

7. The method of claim 6, wherein the method further comprises detecting similar content objects within the content, and wherein the preferred path of navigation is defined by the similar content objects within the content.

8. The method of claim 7, wherein the similar content objects that define the preferred path of navigation are selected by a user.

9. The method of claim 6, wherein determining from the content the at least one preferred path of navigation comprises detecting content objects within the content, wherein the preferred path of navigation is defined by the content objects, and wherein the content objects detected depends on a current display of the content.

10. The method of claim 6, wherein the method further comprises monitoring user interaction with the content to determine the at least one preferred path of navigation.

11. An optimized content navigation system, the system comprising:

a display device comprising a touch screen user interface, and a navigation adjustor engine coupled to the display device, the navigation adjustor engine configured to:
display content on the touch screen user interface, wherein the content is navigable;
determine from the content at least one preferred path of navigation through the content, wherein the preferred path of navigation is based on the content and at least a portion of the preferred path is non-linear;
receive a user input that defines a path of navigation, wherein the user input comprises a swipe on the content displayed on the touchscreen, wherein the user input begins in a location on the touchscreen different than where the preferred path is displayed on the touchscreen;
adjust the user defined path of navigation to follow the preferred path of navigation in response to detection of a difference between an angle of the user defined path of navigation and an angle of the preferred path of navigation to be within a tolerance level of the preferred path of navigation; and
navigate through the content along the adjusted path of navigation and rotate the content on the touch screen user interface to maintain a portion of the preferred route in a particular orientation, wherein the rotating the content is based on the preferred path of navigation.

12. The system of claim 11, wherein the navigation adjustor engine is further configured to detect similar content objects within the content, and wherein the preferred path of navigation is defined by the similar content objects within the content.

13. The system of claim 12, wherein the similar content objects that define the preferred path of navigation are selected by a user.

14. The system of claim 11, wherein the determination from the content of the at least one preferred path of navigation comprises detection of content objects within the content, wherein the preferred path of navigation is defined by the content objects, and wherein the content objects detected depends on a current display of the content.

15. The system of claim 11, wherein the navigation adjustor engine is further configured to monitor user interaction with the content to determine the at least one preferred path of navigation.

* * * * *